(12) United States Patent
Hoffman et al.

(10) Patent No.: US 12,280,902 B2
(45) Date of Patent: Apr. 22, 2025

(54) BALE WRAPPING DEVICE AND METHOD OF OPERATION THEREOF

(71) Applicant: KUHN NORTH AMERICA, INC., Brodhead, WI (US)

(72) Inventors: Thomas Joseph Hoffman, Sun Prairie, WI (US); Dana Eric Redman, Orfordville, WI (US); William John Bassett, Brodhead, WI (US)

(73) Assignee: KUHN NORTH AMERICA, INC., Brodhead, WI (US)

( * ) Notice: Subject to any disclaimer, the term of this patent is extended or adjusted under 35 U.S.C. 154(b) by 521 days.

(21) Appl. No.: 17/645,038

(22) Filed: Dec. 17, 2021

(65) Prior Publication Data
US 2023/0192335 A1   Jun. 22, 2023

(51) Int. Cl.
*B65B 11/00* (2006.01)
*A01F 25/14* (2006.01)
*B65B 41/12* (2006.01)

(52) U.S. Cl.
CPC ............ *B65B 11/008* (2013.01); *A01F 25/14* (2013.01); *B65B 41/12* (2013.01); *A01F 2025/142* (2013.01)

(58) Field of Classification Search
CPC ....... B65B 11/008; B65B 41/12; A01F 25/14; A01F 2025/142
See application file for complete search history.

(56) References Cited

U.S. PATENT DOCUMENTS

| | | | | |
|---|---|---|---|---|
| 4,662,151 A * | 5/1987 | Mathes | ................. | A01F 15/071 53/118 |
| 4,793,124 A * | 12/1988 | Anderson | ............. | A01F 15/071 53/556 |
| 4,917,008 A * | 4/1990 | van den Wildenberg | ................... | A01F 15/0715 53/118 |
| 5,012,631 A * | 5/1991 | Hostetler | ............... | A01F 15/071 53/556 |
| 5,152,125 A * | 10/1992 | Laver | .................... | A01F 15/071 53/210 |
| 5,596,864 A * | 1/1997 | Reeves | ................. | A01F 15/071 53/399 |
| 5,661,956 A * | 9/1997 | Tardif | ................... | B65B 11/008 53/556 |
| 6,070,400 A * | 6/2000 | Peeters | ................. | A01F 15/071 53/588 |
| 6,082,076 A * | 7/2000 | Anderson | ............. | A01F 15/071 53/210 |
| 6,089,003 A * | 7/2000 | Frey | ..................... | A01F 15/071 414/24.5 |
| 8,474,222 B2 * | 7/2013 | Shoemaker | .......... | A01D 90/083 53/167 |

(Continued)

*Primary Examiner* — Lucas E. A. Palmer
(74) *Attorney, Agent, or Firm* — Oblon, McClelland, Maier & Neustadt, L.L.P.

(57) ABSTRACT

A method and a bale wrapping device for wrapping a bale. The method includes receiving a bale at a bale moving ramp device of the bale wrapping device. The bale on the bale moving ramp device is moved through a bale wrapping frame. The breathable sheet of wrapping material is applied on the bale to wrap the bale as the bale passes through the bale wrapping frame, and a roller on the bale wrapping frame holds a roll of the breathable sheet of wrapping material.

12 Claims, 9 Drawing Sheets

(56) References Cited

U.S. PATENT DOCUMENTS

| | | | | |
|---|---|---|---|---|
| 8,696,290 | B2* | 4/2014 | Shoemaker | A01F 25/14 |
| | | | | 414/439 |
| 9,374,946 | B2* | 6/2016 | D'Amours | A01F 25/14 |
| 11,497,172 | B2* | 11/2022 | Giguère | A01F 15/071 |
| 11,815,907 | B2* | 11/2023 | Eubanks | A01F 15/071 |
| 2003/0175096 | A1* | 9/2003 | Korhonen | A01F 15/071 |
| | | | | 414/24.5 |
| 2006/0000193 | A1* | 1/2006 | Naeyaert | A01F 15/071 |
| | | | | 53/587 |
| 2008/0264031 | A1* | 10/2008 | McHale | A01F 15/0715 |
| | | | | 100/88 |
| 2009/0223179 | A1* | 9/2009 | Johnstone | A01F 25/14 |
| | | | | 156/193 |
| 2012/0180430 | A1* | 7/2012 | Lavoie | A01F 25/14 |
| | | | | 53/203 |
| 2016/0183473 | A1* | 6/2016 | Horst | A01F 25/14 |
| | | | | 53/588 |
| 2020/0000042 | A1* | 1/2020 | Desrochers | A01F 15/071 |
| 2021/0144928 | A1* | 5/2021 | Giguère | A01F 15/071 |
| 2021/0400879 | A1* | 12/2021 | Horst | A01F 15/071 |

* cited by examiner

BALE WRAPPING DEVICE AND METHOD OF OPERATION THEREOF

BACKGROUND OF THE INVENTION

Field of the Invention

The present invention relates to the field of bale wrapping devices. More specifically, the present invention relates to an inline and individual bale wrapping device configured for applying material over bale(s) passing through the bale wrapping device and to a method of operation thereof.

Description of the Related Art

Baling of forage crops such as hay has traditionally been used to preserve these crops to feed livestock when needed, such as during the winter or other non-growing seasons or when adequate grazing resources are not otherwise available.

Typically bales are formed in large cylindrical rolls. Bale wrapping devices can be used to wrap bales to further preserve crops to feed livestock when needed. Large cylindrical bales can be wrapped individually or end-to-end in a line (also known as inline bale wrapping.)

The bales are formed in the field by a baler and are then transported to a storage area to be kept until they are needed. In some cases, the bales are wrapped during storage. However, known bale wrapping devices for inline wrapping of bales are usually used to dispense wrapping film solely around a bale or a group of bales. Bales that have moisture content value above a certain threshold value need to maintain an anaerobic state for proper fermentation to occur. Dryer materials that don't reach the moisture content value needed for fermentation can mold if they are not allowed to breathe. If the material is even drier to the level that it won't mold, a sealed environment can still lead to condensation that can create a layer of spoiled material on the outer layer of the bale.

Further, the bale wrapping devices currently used for wrapping bales however tend to suffer from several drawbacks. For example and without being limiting, such bale wrapping devices do not allow the wrapping of bales to provide an optimum temperature and humidity within the drier bales to avoid molds and further spoilage of the bale. Moreover, such bale wrapping devices tend to use a large quantity of wrapping material in the wrapping of each bale, which can be undesirable.

In view of the above, there is a need for an improved bale wrapping device and method, which would be able to overcome, or at least minimize, some of the above-discussed prior art concerns.

SUMMARY OF THE INVENTION

A goal of the current disclosure is to provide a method for wrapping a bale by a bale wrapping device, the method comprising receiving a bale at a bale moving ramp device of the bale wrapping device moving the bale on the bale moving ramp device through a bale wrapping frame; and applying a breathable sheet of wrapping material on the bale to wrap the bale as the bale passes through the bale wrapping frame, wherein a roller on the bale wrapping frame holds a roll of the breathable sheet of wrapping material.

Accordingly, one aspect of the present invention the breathable sheet of wrapping material is a material that repels liquid water while allowing water vapor to pass through. The breathable sheet of wrapping material is at least one of high-density spunbound polyethylene fibers, a fabric membrane composed of stretched polytetrafluoroethylene, or a mesh type material.

In one embodiment, the breathable sheet of wrapping material s applied on the row of bales continuously in a first orientation when the row of bales passes through the bale wrapping frame, wherein the first orientation is along a length of the row of bales.

In another embodiment, a wrapping element is applied on the row of bales continuously in a second orientation when the row of bales passes through the bale wrapping frame, wherein the second orientation is different from the first orientation, and the second orientation is along a perimeter of the row of bales.

BRIEF DESCRIPTION OF THE DRAWINGS

These and other advantages of the invention will become more apparent and more readily appreciated from the following detailed description of the exemplary embodiments of the invention taken in conjunction with the accompanying drawings where.

DETAILED DESCRIPTION OF THE PREFERRED EMBODIMENTS

Figure 1:
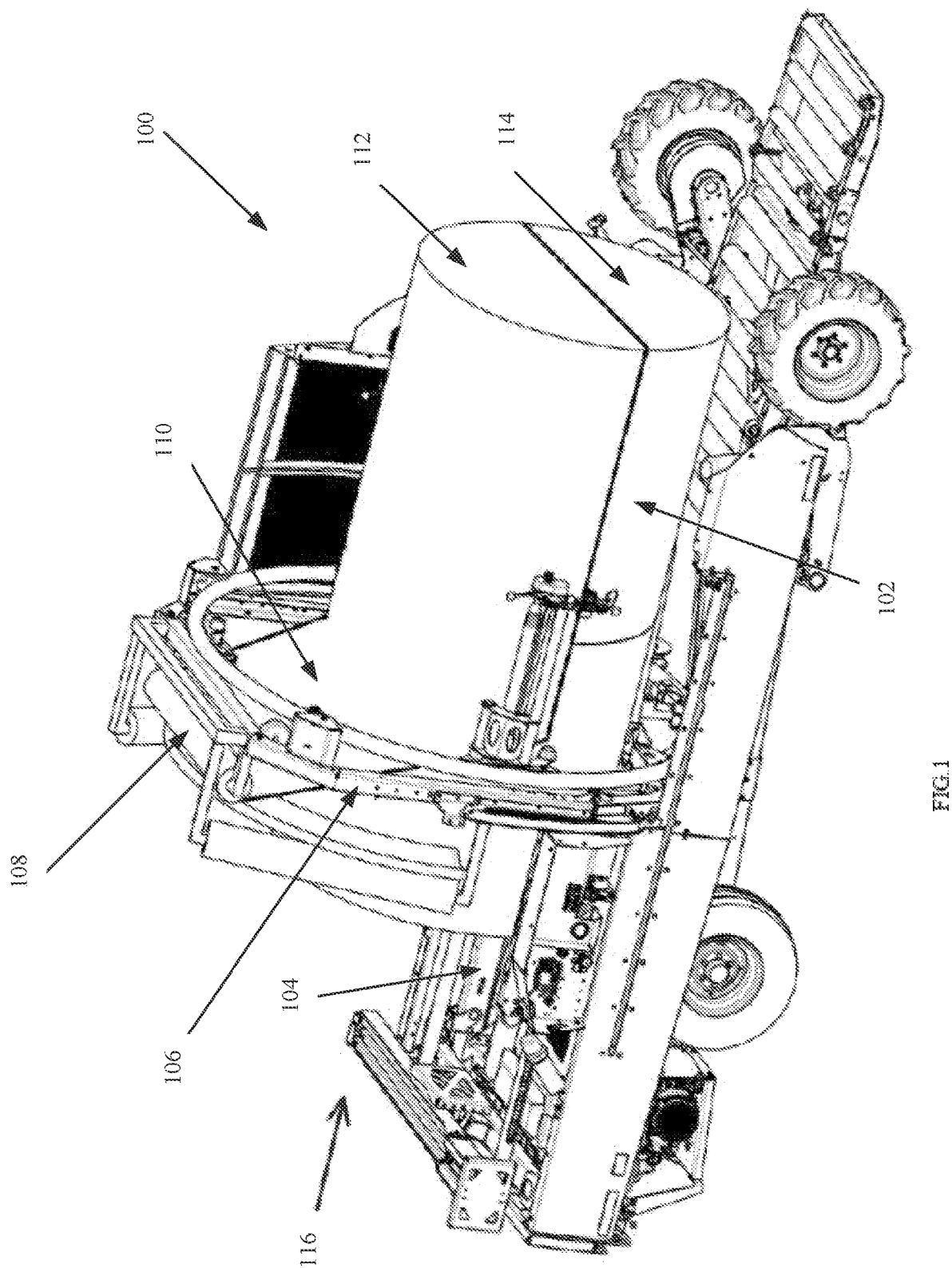
FIG. 1 is a perspective view of a bale wrapping device with a breathable wrapping layer applied to a bale, according to one embodiment.

Various methods, devices, and apparatuses are described below to provide an example of at least one embodiment of the claimed subject matter. No embodiment described below limits any claimed subject matter and any claimed subject matter may cover apparatuses and methods that differ from those described below. The claimed subject matter is not limited to methods, devices, and apparatuses having all of the features of any one methods, devices, or apparatuses described below or to features common to multiple or all of the methods, devices, and apparatuses described below. Subject matter that may be claimed may reside in any combination or sub-combination of the elements or process steps disclosed in any part of this document including its claims and figures. Accordingly, it will be appreciated by a person skilled in the art that methods, devices, and apparatuses disclosed in accordance with the teachings herein may embody any one or more of the features contained herein and that the features may be used in any particular combination or sub-combination that is physically feasible and realizable for its intended purpose.

Furthermore, it is possible that methods, devices, and apparatuses described below is not an embodiment of any claimed subject matter. Any subject matter that is disclosed in and methods, devices, and apparatuses described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

It will also be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

In the following description, the same numerical references refer to similar elements. The embodiments, geometrical configurations, materials mentioned, and/or dimensions shown in the figures or described in the present description are embodiments only, given solely for exemplification purposes.

Moreover, although the embodiments of the bale wrapping device and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation there in between, as well as other suitable geometrical configurations, may be used for the bale wrapping device, as will be briefly explained herein and as can be easily inferred here from by a person skilled in the art. Moreover, it will be appreciated that positional descriptions such as "above", "below", "left", "right" and the like should, unless otherwise indicated, be taken in the context of the figures and should not be considered limiting.

Referring to FIG. 1, illustrated therein is a perspective view of a bale wrapping device 100 for wrapping a bale 102. The bale wrapping device 100 includes a bale moving ramp device 104, a bale wrapping frame 106, a bale wrapping mechanism 108, and a breathable wrapping layer 110.

The bale 102 has an upper half 112 and a lower half 114. In an embodiment, for ease of illustration, FIG. 1 only illustrates the breathable wrapping layer 110 wrapped over the bale 102 such that the breathable wrapping layer 110 is applied over the upper half 112 of the bale 102. However, in an embodiment, the breathable wrapping layer 110 may also be applied to the lower half 114 of the bale 102, such that the entire surface circumference (i.e., the upper half 112 and lower half 114) of the bale 102 is covered by the breathable wrapping layer 110.

The bale 102 is disposed on the bale moving ramp device 104 along the direction 116. The bale 102 moves along the bale moving ramp device 104 to enter the bale wrapping frame 106, such that the breathable wrapping layer 110 is applied on the upper half 112 of the bale 102. The breathable wrapping layer 110 is applied such that the upper half 112 of the bale 102 is covered by the breathable wrapping layer 110. The bale wrapping mechanism 108 includes a roll/stack of the breathable wrapping layer 110, and the breathable wrapping layer 110 is applied on the bale 102 as the bale 102 enters the bale wrapping frame 106 in the direction of 116. As the bale 102 moves away from the bale wrapping frame 106 the breathable wrapping layer 110 is wrapped over the upper half 112 of the bale 102. In an embodiment, the breathable wrapping layer 110 may also be applied to the lower half 114 of the bale 102, such that the upper half 112 and the lower half 114 that covers an entire surface circumference of the bale 102 is covered by the breathable wrapping layer 110.

The breathable wrapping layer 110 is made of a material that repels liquid water while allowing water vapor to pass through from the bale 102. Specifically, the breathable wrapping layer 110 is made of at least one of a Tyvek® type material (i.e., high-density spunbound polyethylene fibers), a Gore-Tex® type material (i.e., waterproof, breathable fabric membrane composed of stretched polytetrafluoroethylene (PTFE)), or a mesh type material.

Figure 2:
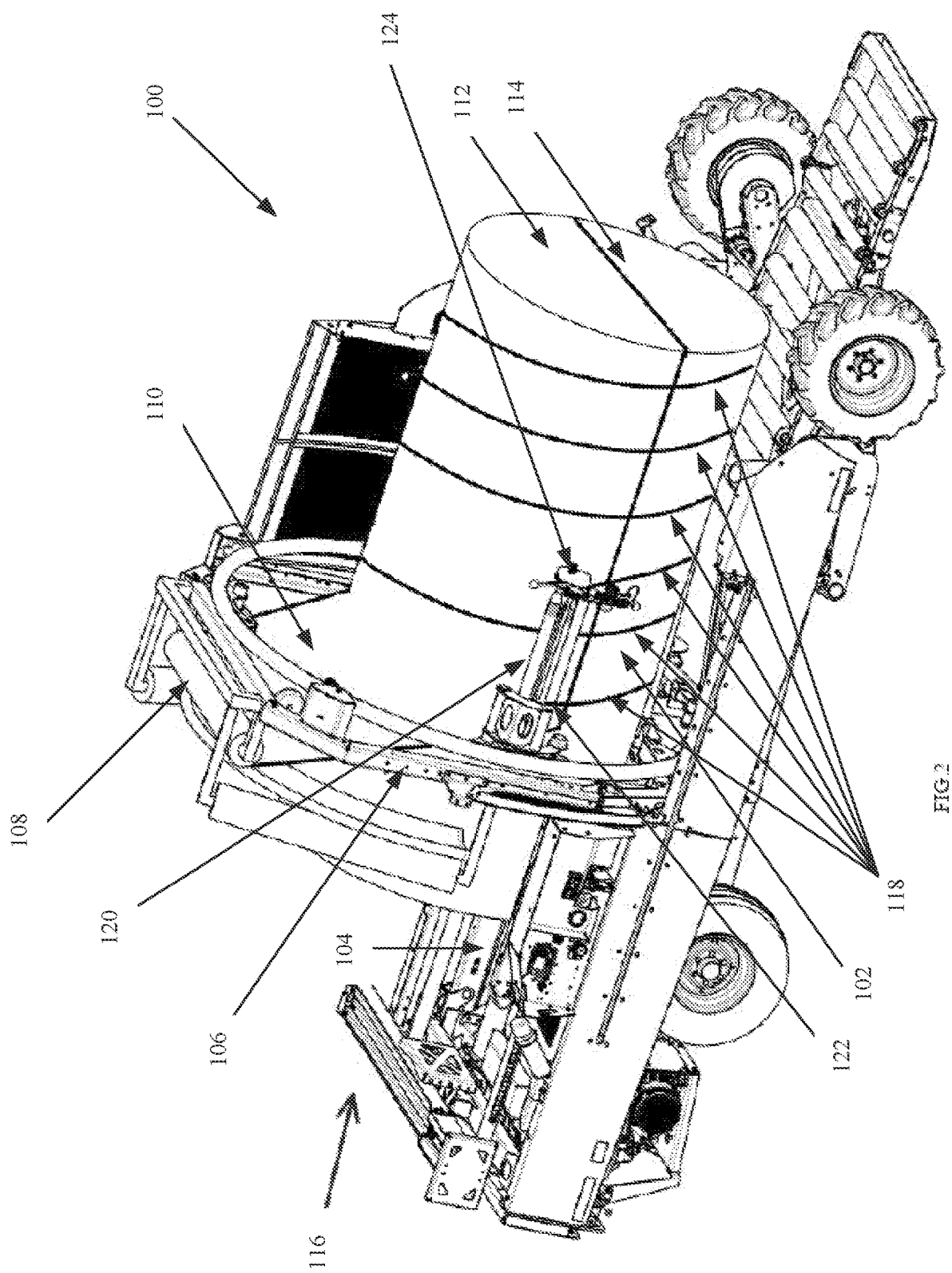
FIG. 2 is the perspective view of the bale wrapping device of FIG. 1 with the breathable wrapping layer applied to the bale and held on by applying a wrapping element, according to one embodiment.

Referring to FIG. 2, illustrated is the perspective view of the bale wrapping device 100 of FIG. 1 with the breathable wrapping layer 110 applied to the bale 102 and held on by applying a wrapping element 118. The wrapping element 118 may be a twine, a string, or a mesh. The wrapping element 118 may be disposed of from a wrapping mechanism 120 that is rotationally mounted to the bale wrapping frame 106 and that holds the at least one wrapping element 118. The wrapping mechanism 120 includes a first end 122 and a second end 124, The wrapping mechanism 120 may dispense the wrapping element 118 over a length of the wrapping mechanism from the first end 122 to the second end 124.

Figure 3:
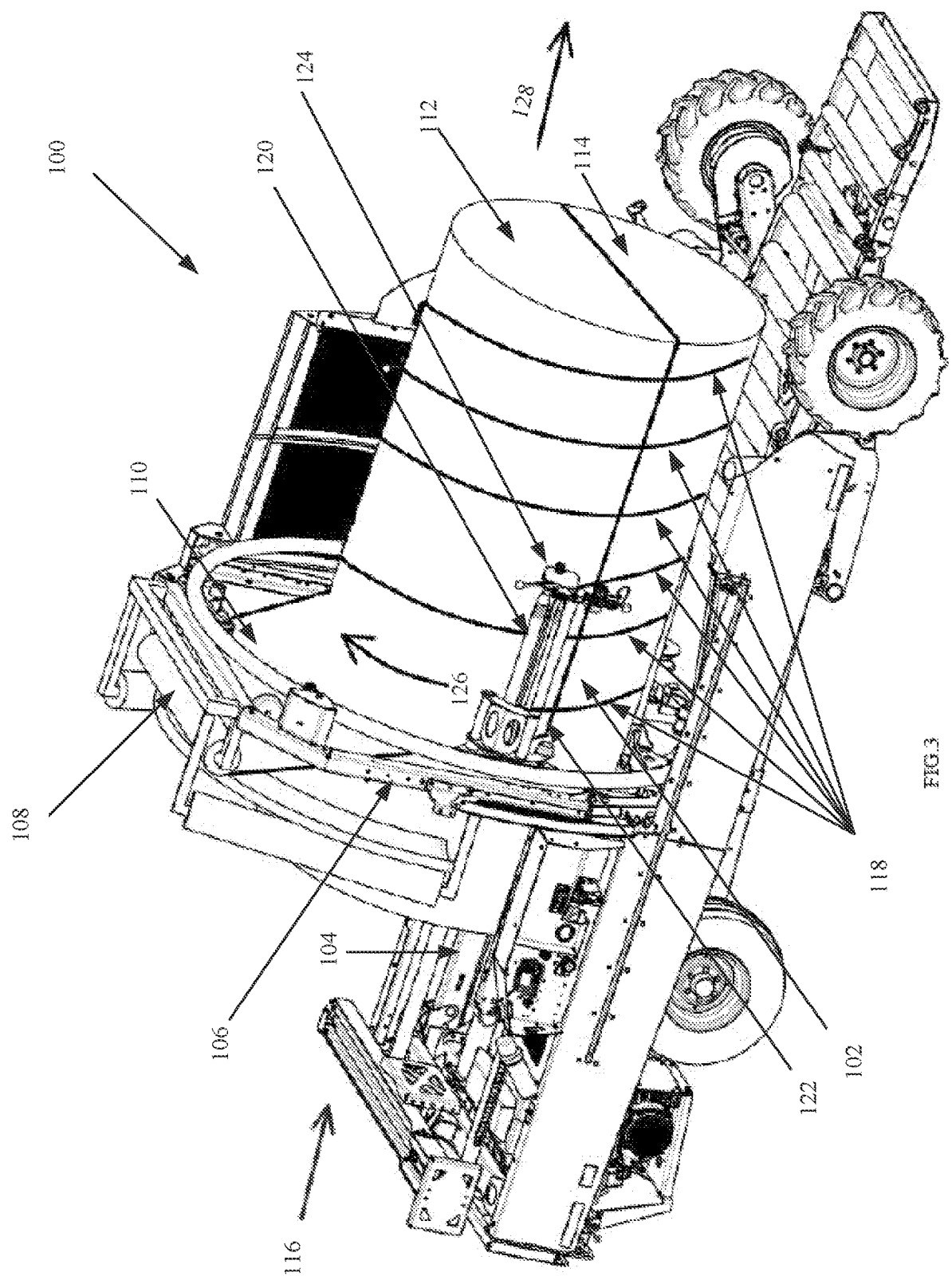
FIG. 3 is the perspective view of FIG. 2 with direction arrows indicating the direction of applying the wrapping element and movement of the bale along the bale moving ramp device, according to one embodiment.

Referring to FIG. 3, illustrated is the perspective view of FIG. 2 with direction arrow 126 indicating the direction of application of the wrapping element 118 over the bale 102 and direction arrow 128 indicates the direction of the movement of the bale 102 along the bale moving ramp device 104. The direction arrow 126 indicates the application of the wrapping element 118 over the surface circumference of the bale 102 while the bale 102 moves in the direction 128 away from the bale wrapping frame 106. A plunger of the bale wrapping device 100 pushes the bale 102 to move the bale 102 along the direction 128.

Figure 4:
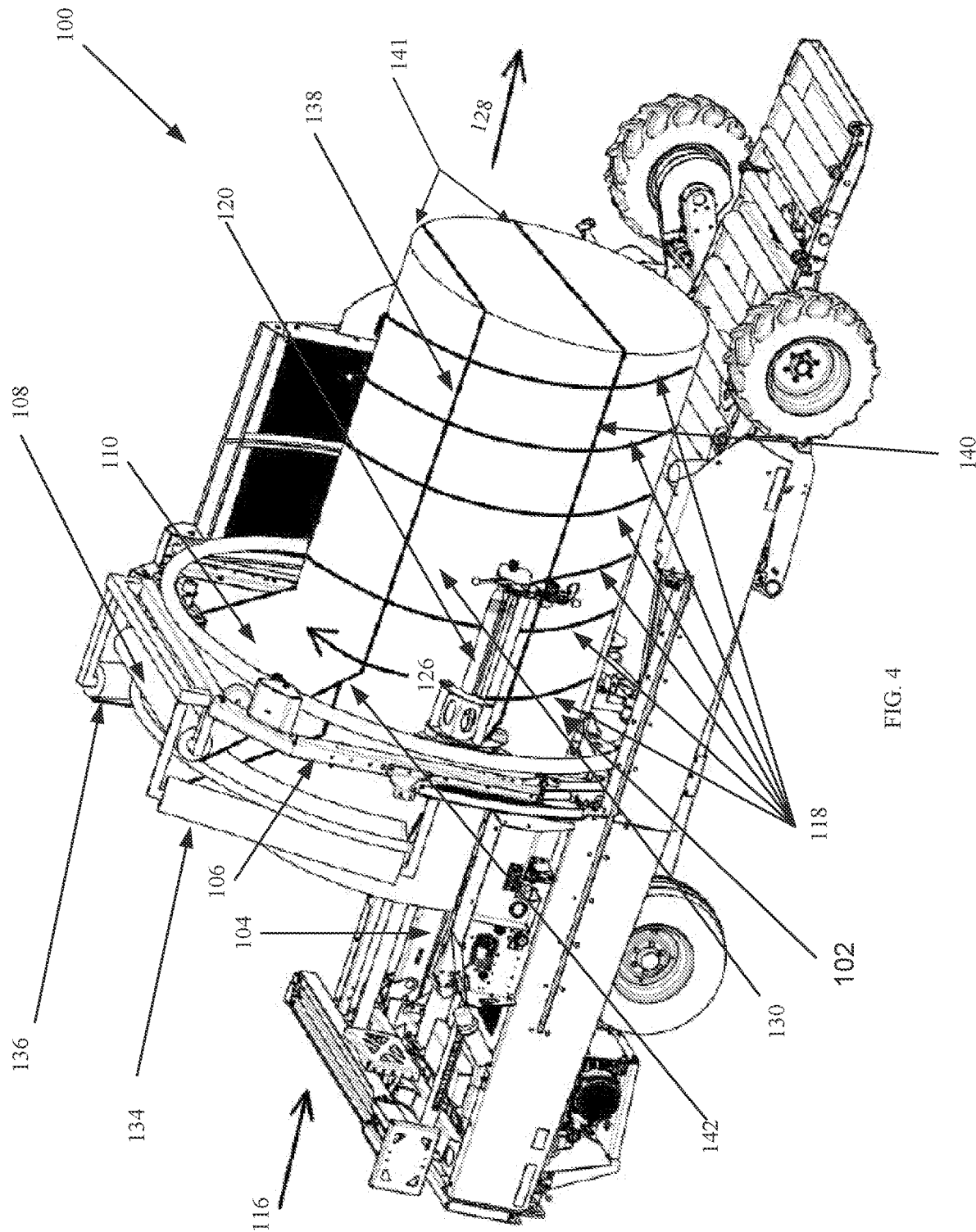
FIG. 4 is a perspective view of the bale wrapping device with the breathable wrapping layer overlapping a film layer applied to a bale and held by applying the wrapping element, according to one embodiment.

Referring to FIG. 4, illustrated is a perspective view of another embodiment of the bale wrapping device 100 with the breathable wrapping layer 110 overlapping a film layer 130 applied to the bale 102 and held by the wrapping element 118. The film layer 130 is made of plastic film material, although any other type of film material may also be included. The bale wrapping device 100 includes a first film wrapping mechanism 134, a second film wrapping mechanism 136, and the bale wrapping mechanism 108. The first film wrapping mechanism 134 includes a roll/stack of the film layer 130 and the second film wrapping mechanism 136 includes another roll/stack of the film layer 130. The bale wrapping mechanism 108 includes a roll/stack of the breathable wrapping layer 110. The first film wrapping mechanism 134 and the second film wrapping mechanism 136 are positioned in front of and towards the sides of the bale wrapping mechanism 108.

The bale 102 is disposed on the bale moving ramp device 104 in the direction 116. The bale 102 moves along the bale moving ramp device 104 to enter the bale wrapping frame 106, such that the first film wrapping mechanism 134 and the second film wrapping mechanism 136 applies the film layer 130 around a perimeter to the bale 102. The perimeter of the bale 102 is defined by the surface area of the bale 102 covered by the region between lines 138 and 140. The film layer 130 from the first film wrapping mechanism 134 and the second film wrapping mechanism 136 is applied to the perimeter of the bale 102 such that a portion of a surface of the bale 102 in between the film layer 130 applied from the first film wrapping mechanism 134 and the second film wrapping mechanism 136 along a portion of the bale 102 is left uncovered. The portion of the bale 102 that is left uncovered in this embodiment is at the top surface of the bale 102.

Further, the bale 102 moves along the bale moving ramp device 104 and crosses the first film wrapping mechanism 134 and the second film wrapping mechanism 136. Then, the bale wrapping mechanism 108 applies the breathable wrapping layer 110 along the length of the bale 102 such that the portion of the surface of the bale 102 left uncovered in between the film layer 130 applied from the first film wrapping mechanism 134 and the second film wrapping mechanism 136, is covered by the breathable wrapping layer 110. The length of the bale 102 is defined by the region covered between the line 138 and before the region defined by 141. The breathable wrapping layer 110 overlaps the film layer 130 applied from the first film wrapping mechanism 134 and the second film wrapping mechanism 136. The overlapping of the breathable wrapping layer 110 and the film layer 130 is explained further in detail with respect to FIG. 5 below.

Next, the wrapping element 118 is applied by the bale wrapping device 100 on the breathable wrapping layer 110 that overlaps the film layer 130 applied to the bale 102. The direction arrows 126 and 128 indicate the direction of application of the wrapping element 118 over the bale 102. Specifically, the direction arrow 126 indicates the application of the wrapping element 118 over the surface circumference of the bale 102 while the bale 102 moves in the direction 128 away from the bale wrapping frame 106.

Figure 5:
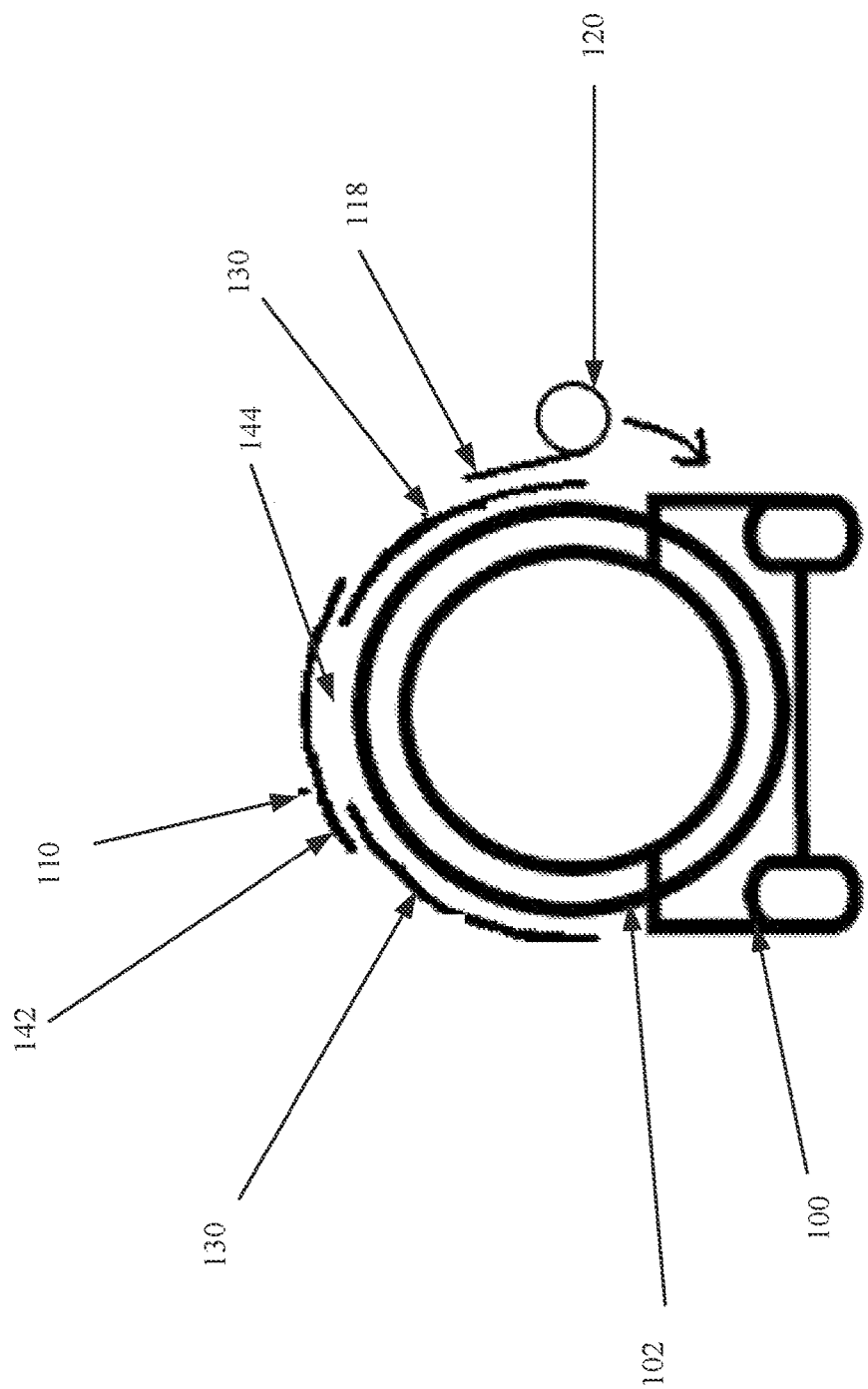
FIG. 5 is a schematic view of the bale of FIG. 4 wrapped with a breathable wrapping layer overlapping the film layer applied to the bale and held by applying the wrapping element, according to one embodiment.

Referring to FIG. 5, illustrated is a schematic view of FIG. 4 with the breathable wrapping layer 110 overlapping the film layer 130 and applied to the bale 102 by the bale wrapping device 100 and held by the wrapping element 118. Further, portion 144 of the surface of the bale 102 is left uncovered in between the film layer 130 applied from the first film wrapping mechanism 134 and the second film wrapping mechanism 136. Although the FIGS. 4-5 illustrates a single portion 144 that is left uncovered however, any number of uncovered portions may also be included by providing multiple portions between the layer 130 that is left uncovered.

Advantages of this technology is that, as the bale 102 only has a top section covered by the breathable wrapping layer 110 any rainwater that comes in contact with the breathable wrapping layer 110 would not enter the breathable wrapping layer 110 and will slide to the sides of the breathable wrapping layer 110 while allowing water vapor generated within the bale 102 to exit out from the bale 102 and pass through the breathable wrapping layer 110. Accordingly, the breathable wrapping layer 110 would repel liquid water while allowing water vapor to pass through. Further, as the repelled water slides away from the breathable wrapping layer 110 to the film layer 130, the film layer 130 would also repel the water as the film layer 130 is made of a material such as plastic that also repels water. As a result water (e.g. rainwater) would not enter the bale 102 from outside, however water vapors generated within the bale 102 would be able to escape the bale 102 via the breathable wrapping layer 110. Thus, this technology maintains optimal moisture content value needed to avoid mold in the bale 102 by allowing the bale 102 to breathe by allowing water vapors to escape the bale 102 and stopping entry of water from outside.

Although FIGS. 1-5 illustrate a single breathable wrapping layer 110 overlapping a single film layer 130 however, any number of the breathable wrapping layer 110 may overlap any number of the film layer 130. Further, any number of wrapping mechanism 120 may also be included to wrap the bale 102.

Figure 6:
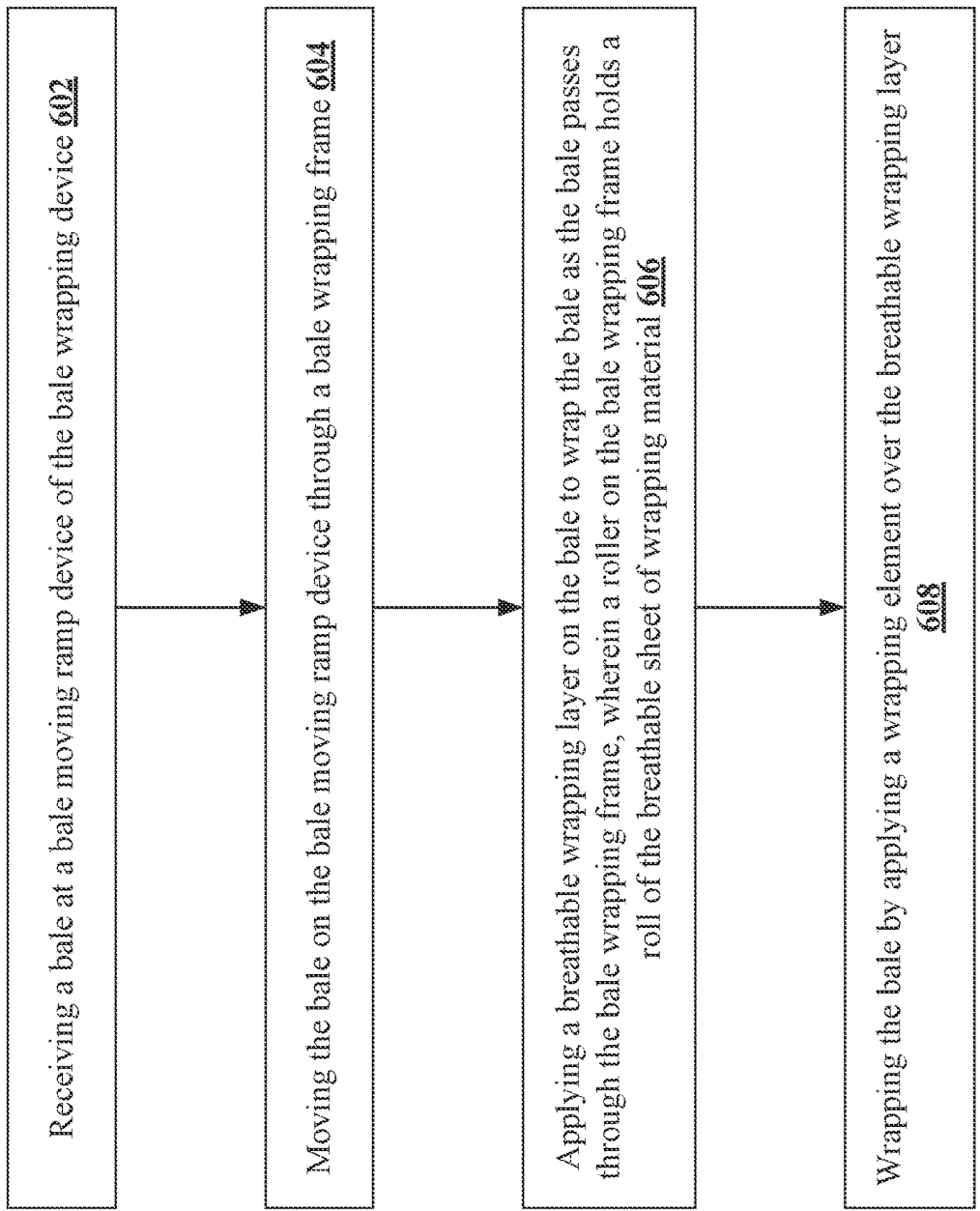
FIG. 6 is a flowchart illustrating a method of wrapping the breathable wrapping layer over the bale and held by applying the wrapping element, according to one embodiment.

Referring to FIG. 6, illustrated is a flowchart depicting the operations performed by the bale wrapping device 100 for application of the breathable wrapping layer 110 over the bale 102 and held by the wrapping element 118. FIG. 6 is explained with reference to FIGS. 1-3.

In step 602, the bale wrapping device 100 receives the bale 102 over the bale moving ramp 104 in the direction of 116. In step 604, the bale 102 moves along the bale moving ramp 104 through the bale wrapping frame 106 in the direction of 116. In step 606, the breathable wrapping layer 110 is applied on at least a portion of the surface circumference of the bale 102, such that the bale 102 is wrapped over by the breathable wrapping layer 110 as the bale 102 passes through the bale wrapping frame 106. The bale wrapping mechanism 108 is coupled to the bale wrapping frame 106 and the bale wrapping mechanism 108 includes a rolUstack of the breathable wrapping layer 110. In step 608, a wrapping element 118 is wrapped over the breathable wrapping layer 110 of the bale 102. The wrapping element 118 may be a twine, a string, or a mesh. The wrapping element 118 may be disposed of from a wrapping mechanism 120 that holds the at least one wrapping element 118. The wrapping mechanism 120 includes a first end 122 and a second end 124. The wrapping mechanism 120 may dispense the wrapping element 118 over a length of the wrapping mechanism from the first end 122 to the second end 124.

Although FIGS. 1-3 illustrate two bales 102 however, any number of bales may also be wrapped inline in accordance with the operations performed by the bale wrapping device 100.

Figure 7:
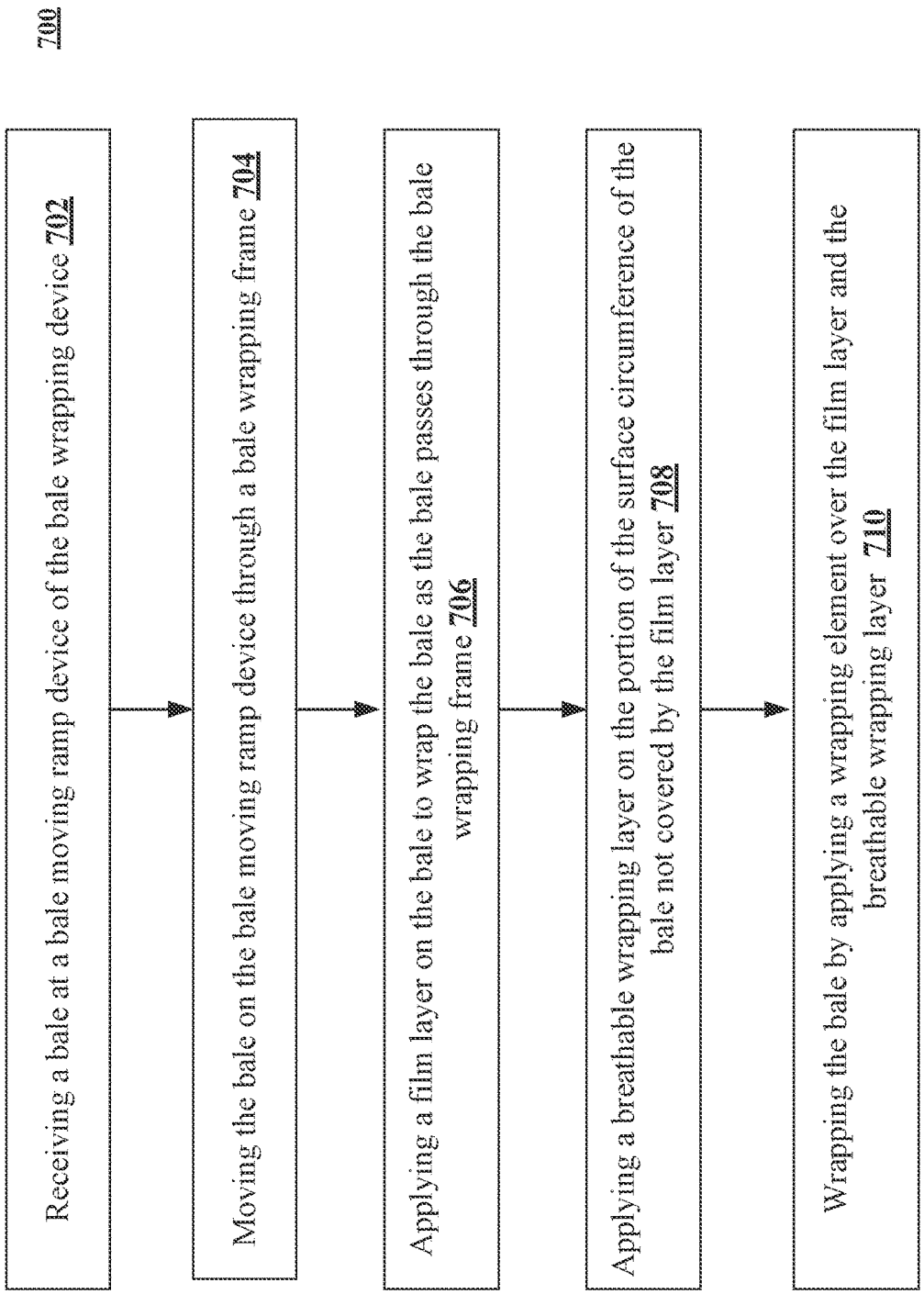
FIG. 7 is a flowchart illustrating a method of wrapping the breathable wrapping layer overlapping the film layer over the bale and held by applying the wrapping element, according to one embodiment.

Referring to FIG. 7, illustrated is a flowchart depicting the operations performed by the bale wrapping device 100 for application of the breathable wrapping layer 110 overlapping the film layer 130 of the bale 102 and held by the wrapping element 118. FIG. 7 is illustrated with reference to FIGS. 4 and 5.

In step 702, the bale wrapping device 100 receives the bale 102 over the bale moving ramp 104 in the direction of 116. In step 704, the bale 102 moves along the bale moving ramp 104 through the bale wrapping frame 106 in the direction of 116.

In step 706, the film layer 130 is applied on at least a portion of the surface circumference of the bale 102, such that the bale 102 is wrapped over by the film layer 130 as the bale 102 passes through the bale wrapping frame 106. The bale 102 moves along the bale moving ramp device 104 to enter the bale wrapping frame 106, such that the first film wrapping mechanism 134 and the second film wrapping mechanism 136 applies the layer 130 to the bale 102. The film layer 130 from the first film wrapping mechanism 134 and the second film wrapping mechanism 136 is applied to the bale 102 such that a portion of a surface of the bale 102 in between the film layer 130 applied from the first film wrapping mechanism 134 and the second film wrapping mechanism 136 is left uncovered.

In step 708, the bale 102 moves along the bale moving ramp device 104 and crosses the first film wrapping mechanism 134 and the second film wrapping mechanism 136. Then, the bale wrapping mechanism 108 applies the breathable wrapping layer 110 to the bale 102 such that the portion of the surface of the bale 102 left uncovered in between the film layer 130 applied from the first film wrapping mechanism 134 and the second film wrapping mechanism 136, is covered. by the breathable wrapping layer 110. The breathable wrapping layer 110 overlaps the film layer 130 applied from the first film wrapping mechanism 134 and the second film wrapping mechanism 136.

In step 710, the wrapping element 118 is applied by the bale wrapping device 100 on the breathable wrapping layer 110 that overlaps the film layer 130 applied to the bale 102. The direction arrows 126 and 128 indicate the direction of application of the wrapping element 118 over the bale 102. Specifically, the direction arrow 126 indicates the application of the wrapping element 118 over the surface circumference of the bale 102 while the bale 102 moves in the direction 128 away from the bale wrapping frame 106.

Although FIGS. 4-5 illustrate two bales 102 however, any number of bales may also be wrapped inline in accordance with the operations performed by the bale wrapping device 100.

Figure 8:
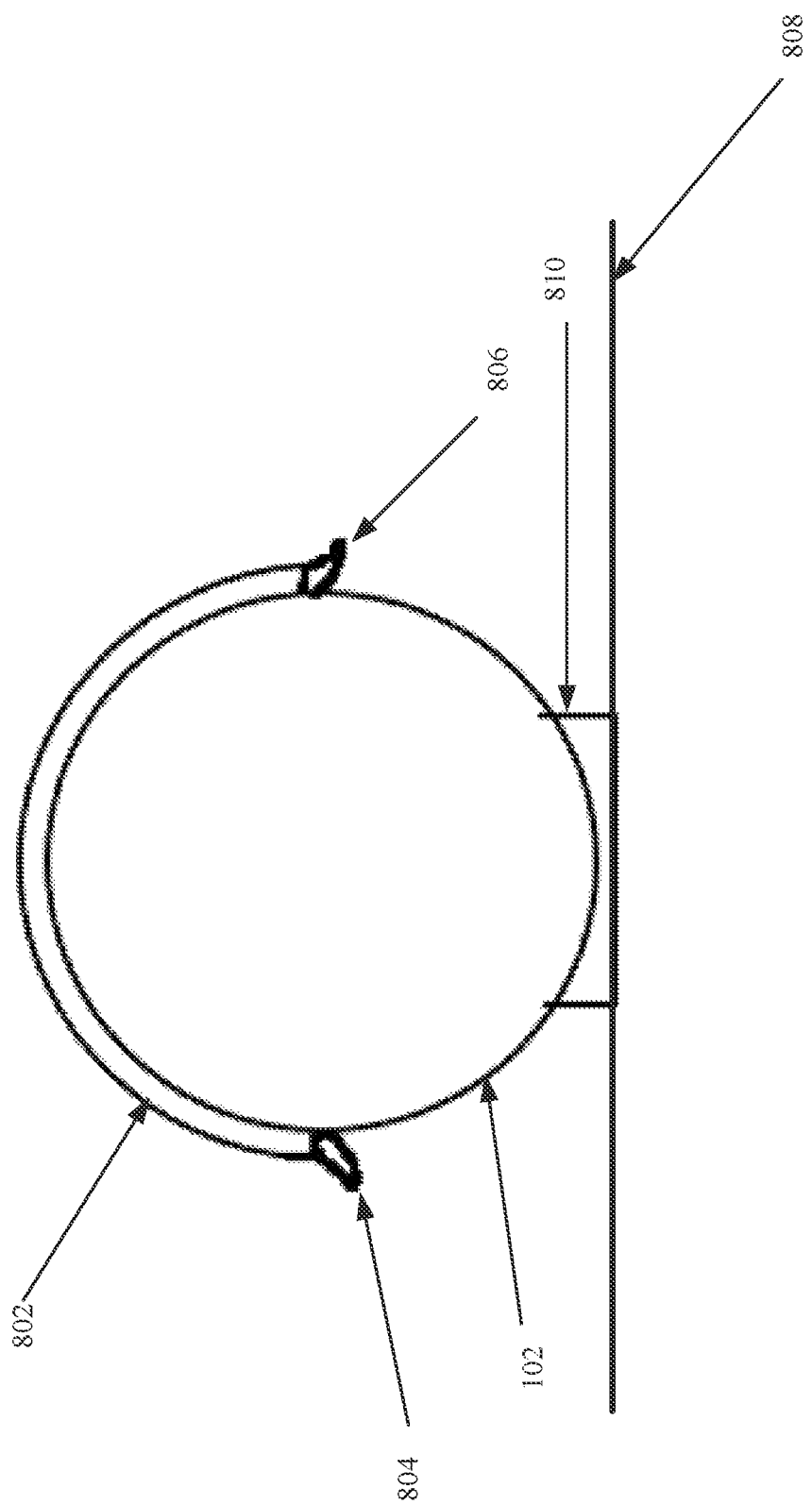
FIG. 8 is a schematic view of the bale wrapped with the material layer applied and with drip edges disposed along the ends of the material layer, according to one embodiment.

Referring to FIG. 8, illustrated is an alternative embodiment of wrapping the bale 102 with a material layer 802 by the bale wrapping device 100. In an embodiment, the material layer 802 may be the film layer 130 or the breathable wrapping layer 110. The bale 102 is wrapped by a material layer 802 such that the material layer 802 covers half of the surface circumference of the bale 102. Further, ends of the material layer 802 are coupled to a first drip edge 804 and a second drip edge 806. The first drip edge 804 and the second drip edge 806 are made of plastic material and are tapered such that any water that falls over the material layer 102 is collected at the first drip edge 804 and the second drip edge 806 and falls over. The first drip edge 804 and the second drip edge 806 are flat plane surfaces that have an angle in the range of 30-60 degrees, preferably 45 degrees from the ground surface 808. Additionally, a moisture barrier 810 is placed below the bale 102. The moisture barrier 810 may be a hollow structure positioned to hold the bale 102 such that the moisture barrier 810 provides ventilation of air into the bale 102. Although FIG. 8 illustrates two drip edges (the first drip edge 804 and the second drip edge 806) however, any number of drip edges may also be included.

Advantages of this technology is that water falling on the material layer 802 (e.g., breathable wrapping layer 110) the water is repelled from the material layer 802 and the water falls off from the first drip edge 804 and the second drip edge 806. Accordingly, the water does not enter the bale 102. As a result water (e.g. rainwater) would not enter the bale 102 from outside, however water vapors generated within the bale 102 would be able to escape the bale 102 via the material layer 802. Thus, this technology maintains an optimal moisture content value needed to avoid mold in the bale 102 by allowing the bale 102 to breathe by allowing water vapors to escape the bale 102.

In a further embodiment of the invention, the first drip edge 804 and the second drip edge 804 may be formed by placing a drip edge structure (not shown) beneath the material layer 802 and the contour of the drip edge structure creates a contour in the material layer 802 that redirects the water from following the contour of the bale 102.

Figure 9:
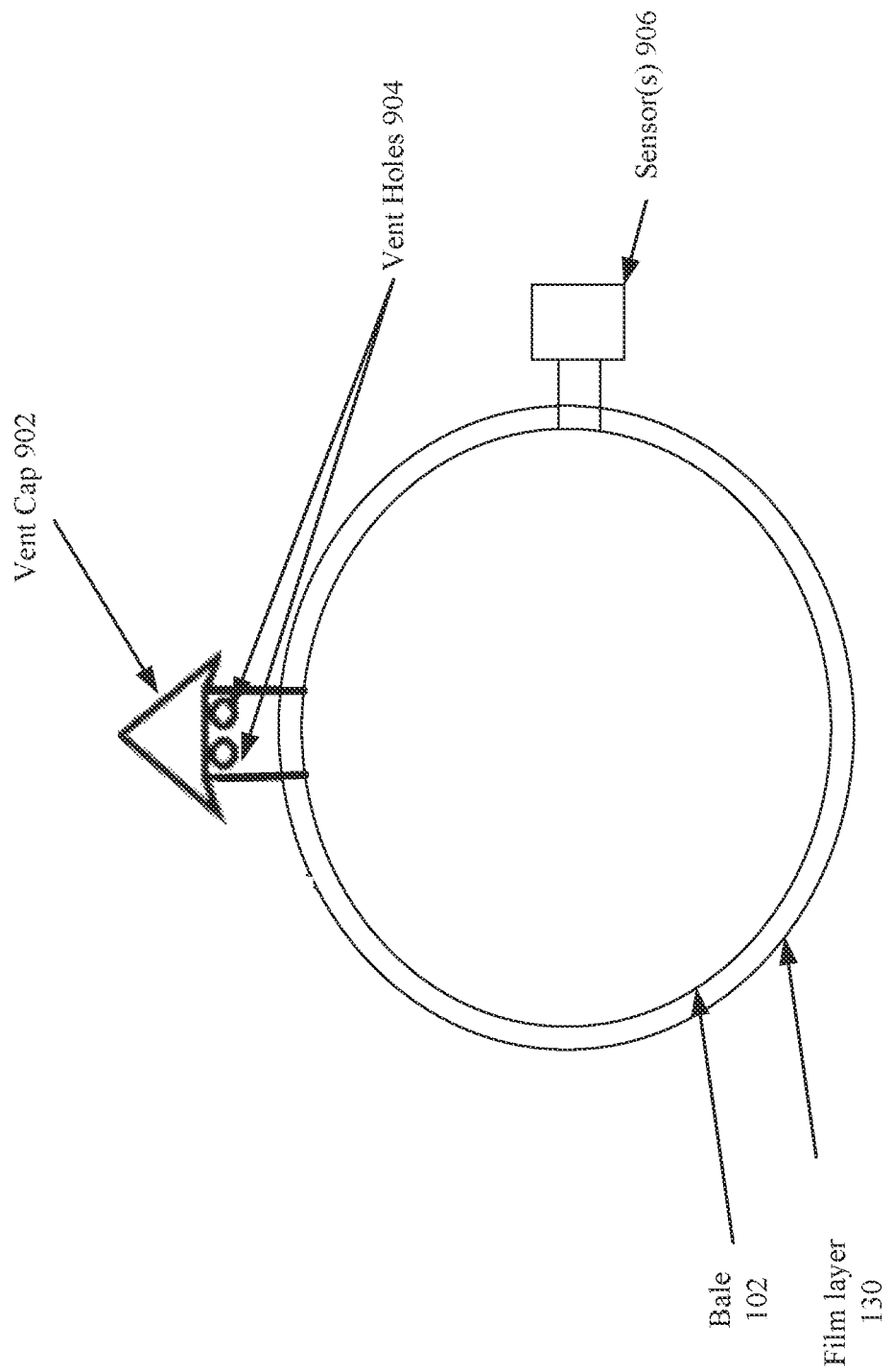
FIG. 9 is a schematic view of the bale wrapped with the film layer having a vent cap disposed over the bale, according to one embodiment.

Referring to FIG. 9, illustrated is an alternative embodiment of wrapping the bale 102 with a film layer 130 by the bale wrapping device 100. The film layer 130 may be made of plastic film material. A vent cap 902 is disposed on top of the bale 102 such that the vent cap 902 penetrates the film layer 130 to reach the surface of the bale 102 and provides air ventilation through vent holes 904. The vent cap 902 allows air to vent into the bale 102. Although FIG. 9 illustrates a single vent cap 902 however, any number of vent caps may also be disposed over the bale 102.

Advantages of this technology is that water falling on the vent cap 902 and the film layer 130 (e.g., plastic film) the water does not penetrate the film layer 130 and the water is repelled off from the film layer 130, however water vapors generated within the bale 102 would be able to escape the bale 102 via the vent holes 904 of the vent cap 902. Thus, this technology maintains an optimal moisture content value needed to avoid mold in the bale 102 by allowing the bale 102 to breathe by allowing water vapors to escape the bale 102.

In an embodiment, in FIG. 9 sensor(s) 906 may be applied beneath the film layer 130 such that parameters that can be used to determine bale quality such as temperature, moisture, humidity and further constituents such as fat, protein, sugar, fiber content, etc. of the bale 102 are measured by the sensor(s) 906. The sensor may also measure reflectance of light such as a near-infrared sensor and can determine the properties of the material within the row of bales. This quality or constituent data can be recorded, analyzed or transmitted. Based on the analysis of the data, the user or a software designed to analyze the data can make decisions on when and/or how to feed a row of bales or a bale within the row of bales. The sensor(s) 906 may include a memory and a processor, and the processor wired or wirelessly coupled to the vent cap 902. The vent cap 902 may include another memory and another processor programmed to receive communications from the sensors(s) 906. The processor of the sensor(s) 906 are programmed to transmit instructions to the processor of the vent cap 902 to control the opening and closing of vent holes 904 of the vent cap 902 based on the measured internal temperature and humidity of the bale 102.

In a further embodiment, the at least one vent cap 902 is placed on top of the bale prior to the film layer 130 being applied. The vent cap 902 penetrates the film layer 130 to expose the vent holes 904.

By way of example, when the temperature of the bale 102 exceeds a predetermined threshold temperature value the processor of the sensor(s) 906 are programmed to transmit instructions to the processor of the vent cap 902 to open the vent holes 904 of the vent cap 902. By way of example, when the temperature of the bale 102 is below the predetermined threshold temperature value the processor of the sensors(s) 906 are programmed to transmit instructions to the processor of the vent cap 902 to close the vent holes 904 of the vent cap 902.

By way of example, when the humidity of the bale 102 exceeds a predetermined threshold humidity value the processor of the sensor(s) 906 are programmed to transmit instructions to the processor of the vent cap 902 to open the vent holes 904 of the vent cap 902. By way of example, when the humidity of the bale 102 is below the predetermined threshold humidity value the processor of the sensor(s) 906 are programmed to transmit instructions to the processor of the vent cap 902 to close the vent holes 904 of the vent cap 902.

In an additional embodiment, the sensor(s) 906 may include a memory and a processor, and the processor wired or wirelessly coupled to the include a transmission element. The transmission element can send information on parameters such as internal temperature and humidity of the bale 102 to a further device such as a smart phone for viewing or alerts. These parameters can then be assessed by the user to monitor for an undesired change in storage conditions.

By way of example, when the humidity of the bale 102 exceeds a predetermined threshold humidity value the processor of the sensor(s) 906 are programmed to transmit via the transmission element, a message to the user so the user would know to utilize a bale before spoilage occurs.

It will be understood that, in alternative embodiments, different components or assemblies resulting in a longitudinal movement of a component along the side surface of the bale and capable of pulling a section of side surface film towards a cutting assembly, where the side surface film is cut and a section is released while another section of side surface film is maintained thereon, could be used. One skilled in the art will understand that accordingly, the steps of a corresponding method of operation could also differ from the one described above.

Several alternative embodiments and examples have been described and illustrated herein. The embodiments described above are intended to be exemplary only. A person skilled in the art would appreciate the features of the individual embodiments and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

While the applicant's teachings described herein are in conjunction with various embodiments for illustrative purposes, it is not intended that the applicants teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A method for wrapping a bale by a bale wrapping device, the method comprising:
    receiving a bale at a bale moving ramp device of the bale wrapping device;
    moving the bale on the bale moving ramp device through a bale wrapping frame;
    applying a breathable sheet of wrapping material on the bale to wrap the bale as the bale passes through the bale wrapping frame, wherein a roller on the bale wrapping frame holds a roll of the breathable sheet of wrapping material;
    receiving a bale at the bale moving ramp device, wherein the received bale is part of a row of bales; and
    applying the breathable sheet of wrapping material on the row of bales continuously in a first orientation when the row of bales passes through the bale wrapping frame, wherein the first orientation is along a length of the row of bales; and
    applying a wrapping element on the row of bales continuously in a second orientation when the row of bales passes through the bale wrapping frame, wherein the second orientation is different from the first orientation, and the second orientation is along a perimeter of the row of bales.

2. The method of claim 1, wherein the breathable sheet of wrapping material is a material that repels liquid water while allowing water vapor to pass through.

3. The method of claim 1, wherein the breathable sheet of wrapping material is at least one of high-density spunbound polyethylene fibers, a fabric membrane composed of stretched polytetrafluoroethylene, or a mesh type material.

4. The method of claim 1,
    wherein a wrapping mechanism on the bale wrapping frame holds a roll of the wrapping element.

5. The method of claim 4, further comprising:
    attaching one or more sensors to the row of bales, wherein the one or more sensors are configured to measure at least a first parameter within the row of bales at a position where the one or more sensors are attached to the row of bales, and the first parameter is indicative of bale quality.

6. The method of claim 5, wherein the first parameter is one of moisture, temperature, and humidity.

7. The method of claim 1, further comprising:
    applying a film layer, adjacent to the breathable sheet of wrapping material, on the row of bales continuously in the first orientation.

8. The method of claim 7, wherein the breathable sheet of wrapping material applied on the row of bales continuously in the first orientation is a wrapping material including high-density spunbound polyethylene fibers, the film layer applied on the row of bales continuously in the first orientation is a plastic material, and the wrapping element applied on the row of bales continuously in the second orientation is a twine or mesh type wrapping material.

9. The method of claim 7, wherein a pair of side rollers on the bale wrapping frame hold a roll of the film layer at a right side and a left side of the bale wrapping frame.

10. The method of claim 1, wherein the roller on the bale wrapping frame that holds the roll of the breathable sheet of wrapping material is positioned at a top position of the bale wrapping frame.

11. A method for wrapping a bale by a bale wrapping device, the method comprising:
    receiving a bale at a bale moving ramp device of the bale wrapping device;

moving the bale on the bale moving ramp device through a bale wrapping frame;

applying a breathable sheet of wrapping material on the bale to wrap the bale as the bale passes through the bale wrapping frame, wherein a roller on the bale wrapping frame holds a roll of the breathable sheet of wrapping material;

receiving a bale at the bale moving ramp device, wherein the received bale is part of a row of bales;

applying the breathable sheet of wrapping material on the row of bales continuously in a first orientation when the row of bales passes through the bale wrapping frame, wherein the first orientation is along a length of the row of bales;

applying a wrapping element on the row of bales continuously in a second orientation when the row of bales passes through the bale wrapping frame, wherein the second orientation is different from the first orientation, and the second orientation is along a perimeter of the row of bales; and applying a film layer, adjacent to the breathable sheet of wrapping material, on the row of bales continuously in the first orientation, wherein the breathable sheet of wrapping material applied on the row of bales continuously in the first orientation is a wrapping material including high-density spunbound polyethylene fibers, the film layer applied on the row of bales continuously in the first orientation is a plastic material, and the wrapping element applied on the row of bales continuously in the second orientation is a twine or mesh type wrapping material.

12. A method for wrapping a bale by a bale wrapping device, the method comprising:

receiving a bale at a bale moving ramp device of the bale wrapping device;

moving the bale on the bale moving ramp device through a bale wrapping frame; and applying a breathable sheet of wrapping material on the bale to wrap the bale as the bale passes through the bale wrapping frame, wherein a roller on the bale wrapping frame holds a roll of the breathable sheet of wrapping material;

receiving a bale at the bale moving ramp device, wherein the received bale is part of a row of bales;

applying the breathable sheet of wrapping material on the row of bales continuously in a first orientation when the row of bales passes through the bale wrapping frame, wherein the first orientation is along a length of the row of bales;

applying a wrapping element on the row of bales continuously in a second orientation when the row of bales passes through the bale wrapping frame, wherein the second orientation is along a perimeter of the row of bales and wherein a wrapping mechanism on the bale wrapping frame holds a roll of the wrapping element; and attaching one or more sensors to the row of bales, wherein the one or more sensors are configured to measure at least a first parameter within the row of bales at a position where the one or more sensors are attached to the row of bales, and the first parameter is indicative of bale quality.

* * * * *